US012103718B1

(12) United States Patent
Jackson et al.

(10) Patent No.: US 12,103,718 B1
(45) Date of Patent: Oct. 1, 2024

(54) SELF-CHARGING MODULAR PORTABLE SURVIVAL DRONE THAT RECHARGES BY NATURAL ELEMENTS

(71) Applicants: Robert Lee Jackson, Rossmoor, CA (US); Lucille Fonseca Jackson, Rossmoor, CA (US)

(72) Inventors: Robert Lee Jackson, Rossmoor, CA (US); Lucille Fonseca Jackson, Rossmoor, CA (US)

( * ) Notice: Subject to any disclaimer, the term of this patent is extended or adjusted under 35 U.S.C. 154(b) by 0 days.

(21) Appl. No.: 18/205,444

(22) Filed: Jun. 2, 2023

(51) Int. Cl.
| | |
|---|---|
| *B64U 50/34* | (2023.01) |
| *B60L 8/00* | (2006.01) |
| *B60L 50/60* | (2019.01) |
| *B60L 53/00* | (2019.01) |
| *B64D 27/24* | (2006.01) |
| *B64U 10/14* | (2023.01) |
| *B64U 20/40* | (2023.01) |
| *B64U 50/14* | (2023.01) |
| *B64U 50/37* | (2023.01) |
| *H02J 7/14* | (2006.01) |
| *B64U 101/55* | (2023.01) |

(52) U.S. Cl.
CPC ............... *B64U 50/34* (2023.01); *B60L 8/00* (2013.01); *B60L 50/60* (2019.02); *B60L 53/00* (2019.02); *B64D 27/24* (2013.01); *B64U 10/14* (2023.01); *B64U 20/40* (2023.01); *B64U 50/14* (2023.01); *B64U 50/37* (2023.01); *H02J 7/1415* (2013.01); *B60L 2200/10* (2013.01); *B64D 2203/00* (2013.01); *B64U 2101/55* (2023.01); *B64U 2201/10* (2023.01)

(58) Field of Classification Search
CPC ........ B64U 50/14; B64U 50/34; B64U 50/36; B64U 50/37; B64U 20/40
See application file for complete search history.

(56) References Cited

U.S. PATENT DOCUMENTS

| 8,167,234 B1* | 5/2012 | Moore | ..................... B64C 37/00 244/17.23 |
|---|---|---|---|
| 2020/0002015 A1* | 1/2020 | Hiller | ..................... B64U 50/37 |
| 2020/0130795 A1* | 4/2020 | Fikes | ..................... B63G 8/39 |
| 2021/0300594 A1* | 9/2021 | Thrun | ................. B64C 29/0025 |

\* cited by examiner

*Primary Examiner* — Richard G Davis
(74) *Attorney, Agent, or Firm* — Plager Schack LLP; Mark H. Plager, Esq.; Stephen F. Hallberg, Esq.

(57) ABSTRACT

A self-charging modular portable survival drone that recharges by natural elements is disclosed. The self-charging modular portable survival drone is capable of conventionally charging other devices, performing remote flight operations, and signaling for help. The natural elements include wind and water. The self-charging modular portable survival drone is configured to rapidly and repeatedly charge mobile battery units stored in ducted fan assemblies. The ducted fan assemblies can be used to charge personal electronic devices and power remote flight operations via modular drone. The self-charging modular portable survival drone can be used to signal for help using onboard high-output LEDs during SOS flight operations. The self-charging modular portable survival drone can further be used, during SOS flight operations, to broadcast current GPS coordinates over local search and rescue bands.

10 Claims, 10 Drawing Sheets

SELF-CHARGING MODULAR PORTABLE SURVIVAL DRONE THAT RECHARGES BY NATURAL ELEMENTS

BACKGROUND

Embodiments of the invention described in this specification relate generally to survival devices, and more particularly, to a self-charging modular portable survival drone that recharges by natural elements (such as water and wind) and is capable of conventionally charging other devices, performing remote flight operations, and signaling for help.

In the present day and age, survival in remote areas typically involves the use of electronic devices or other technology that require access to remote charging and the ability to signal for help in an emergency. Current electronic devices and other such technology for survival purposes are limited to single source charging and satellite link up for emergency communication.

None of the existing technology provides self-charging drones which can be recharged by natural elements, such as wind and water. Instead, current technology and devices are reliant on energy accessed from the power-grid (i.e., via a conventional plug-in power source). Furthermore, the existing battery-powered devices only have limited power which translates to limited time for person in a remote location who is in need of rescue. Eventually, the batteries need recharging so that the person can continue to seek out others who may find or rescue the person. Yet, the situation that arises when the person at some remote location away from standard power-grid access can be dire. For example, the person may have a handheld device, such as a smartphone, which, even when out of range of all wireless communication networks, would allow the person to flash the light of the phone as a distress signal (or "SOS" signal). However, when the battery of the phone is fully drained of power, the person is left with almost no ability to signal SOS. Similarly, the person may be able to use their phone to broadcast their current GPS coordinates in the hopes that nearby rescue teams would capture the broadcast and travel to the location indicated by the GPS coordinates. But again, this is only possible if the phone's battery has sufficient power remaining.

Even when an electronic device, such as a phone, has remaining battery power, the conditions and/or geography of the remote location of the person may prevent adequate distress signaling or other such communication. For example, the light of a phone may not penetrate a thick forest canopy, so signaling for help by flashing the light would not help unless the person were to climb a tree to signal from above the trees. Similarly, broadcasting of GPS coordinates may be problematic due to physical obstructions such as rock, etc.

Therefore, what is needed is a survival device that is configured to self-charge by natural elements and is capable of charging other devices, performing remote flight operations, and signaling for help.

BRIEF DESCRIPTION

A novel self-charging modular portable survival drone that recharges by natural elements is disclosed. In some embodiments, the self-charging modular portable survival drone that recharges by natural elements is capable of conventionally charging other devices, performing remote flight operations, and signaling for help. In some embodiments, the natural elements by which the self-charging modular portable survival drone recharges comprise wind and water.

In some embodiments, the self-charging modular portable survival drone is configured to rapidly and repeatedly charge mobile battery units stored in ducted fan assemblies of the drone. In some embodiments, the ducted fan assemblies can be used to charge personal electronic devices and power remote flight operations by way of a modular drone. In some embodiments, the self-charging modular portable survival drone can be used to signal for help using onboard high-output LEDs during SOS flight operations. In some embodiments, the self-charging modular portable survival drone can further be used, during SOS flight operations, to broadcast current GPS coordinates over local search and rescue bands.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
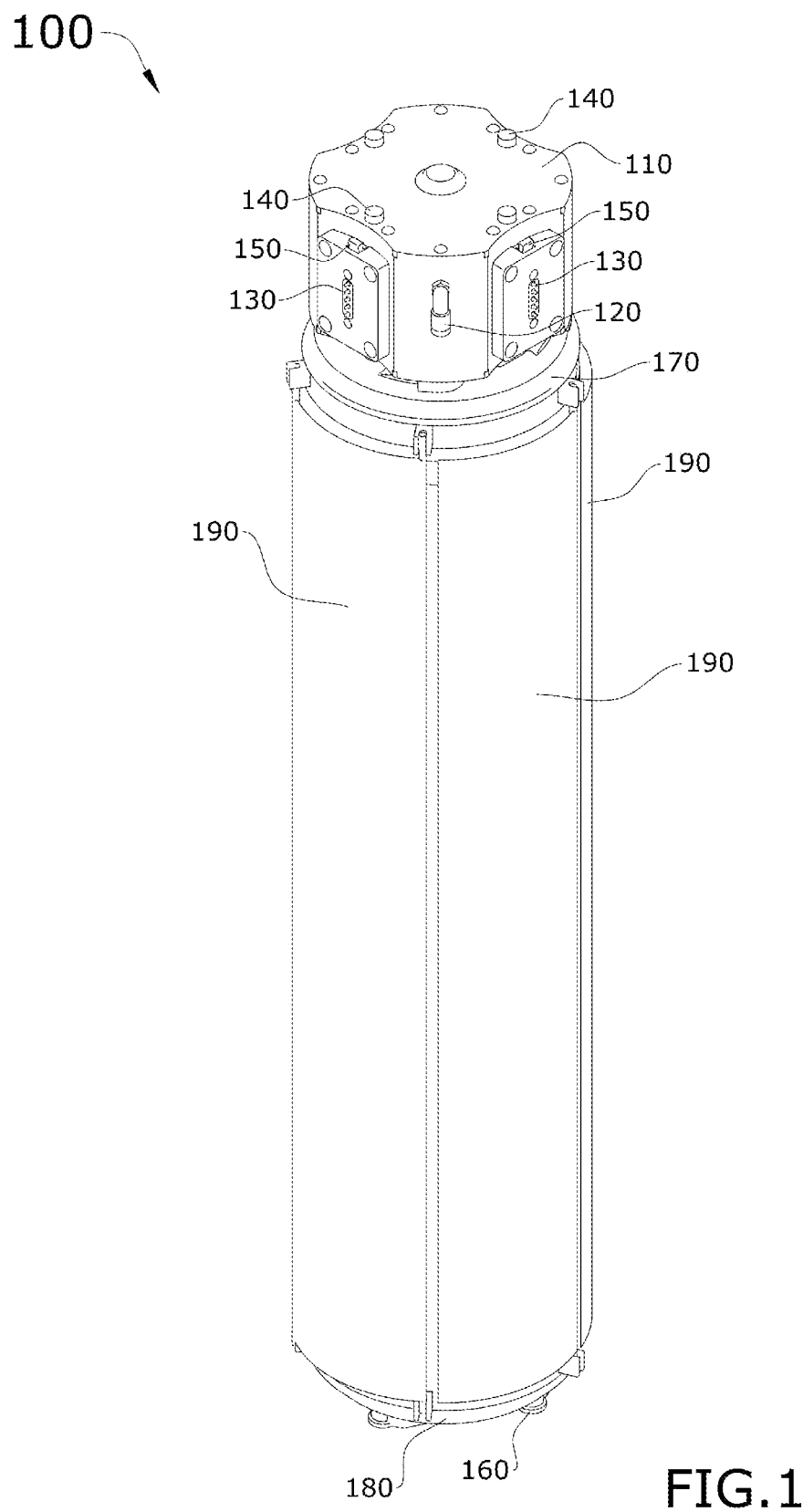
FIG. 1 conceptually illustrates a perspective view of a self-charging modular portable survival drone of some embodiments in a carry configuration.

In the following detailed description of the invention, numerous details, examples, and embodiments of the invention are described. However, it will be clear and apparent to one skilled in the art that the invention is not limited to the embodiments set forth and that the invention can be adapted for any of several applications.

In some embodiments, the self-charging modular portable survival drone is capable of recharging by natural elements and is capable of conventionally charging other devices, performing remote flight operations, and signaling for help. In some embodiments, the natural elements by which the self-charging modular portable survival drone recharges comprise wind and water.

In some embodiments, the self-charging modular portable survival drone is configured to rapidly and repeatedly charge mobile battery units stored in ducted fan assemblies of the drone. In some embodiments, the ducted fan assemblies can be used to charge personal electronic devices and power remote flight operations by way of a modular drone. In some embodiments, the self-charging modular portable survival drone can be used to signal for help using onboard high-output LEDs during SOS flight operations. In some embodiments, the self-charging modular portable survival drone can further be used, during SOS flight operations, to broadcast current GPS coordinates over local search and rescue bands.

As stated above, survival in remote areas in modern day requires access to remote charging and the ability to signal for help in an emergency. Current technology is limited to single source charging and satellite link up for emergency communication. Embodiments of the self-charging modular portable survival drone that recharges by natural elements described in this specification solve such problems by providing a full-equipped survival drone device that is capable for charging batteries by wind or water. Current and existing mobile wind or water turbines require assembly using fasteners which, when lost, render their respective units useless. Additionally, existing wind and water turbines do not erect into a flying drone that can signal for help. By contrast, the self-charging modular portable survival drone that recharges by natural elements of the present disclosure provides a modular aerial drone that is self-charging by way of natural elements, such as water and wind. The self-charging modular portable survival drone is fully-equipped with its components being entirely connected and/or encapsulated. Therefore, the self-charging modular portable survival drone does not require or use any conventional fasteners or conventional tools.

Embodiments of the self-charging modular portable survival drone that recharges by natural elements described in this specification differ from and improve upon currently existing options. In particular, some embodiments differ from existing devices and current technology which is limited to single source charging and satellite link up for emergency communication. Furthermore, the existing devices and current technology do not offer integrated self-charging by natural elements to provide power for flight operations, distress signaling, and personal device charging. Additionally, the existing technology and devices require fasteners and complicated assembly steps. By contrast, the self-charging modular portable survival drone does not utilize fasteners that require additional tools since all of its components interlock and store effectively and effortlessly in a backpack or other small bag or container, thereby minimizing complexity and aiding in rapid deployment. In the event of an emergency, the self-charging modular portable survival drone can carry a cellular phone or personal communication device up to altitude where communication with satellites and local emergency personnel can be made and onboard GPS coordinates can be shared autonomously via onboard communication systems.

In particular, the self-charging modular portable survival drone that recharges by natural elements described in this specification is configured to utilize both wind and water to rapidly and repeatedly charge mobile battery units stored in the ducted fan assemblies. The assemblies can be used to charge personal electronic devices as well as power remote flight operations via a modular drone. The drone can also be used to signal for help using onboard high-output LEDs during SOS flight operations as well as broadcast current GPS coordinates over local search and rescue bands.

The self-charging modular portable survival drone that recharges by natural elements of the present disclosure may be comprised of the following elements. This list of possible constituent elements is intended to be exemplary only and it is not intended that this list be used to limit the self-charging modular portable survival drone of the present application to just these elements. Persons having ordinary skill in the art relevant to the present disclosure may understand there to be equivalent elements that may be substituted within the present disclosure without changing the essential function or operation of the self-charging modular portable survival drone.

Assembled carry configuration
Wind charging configuration
Water charging configuration
Rescue drone configuration
Ducted fan(s) and charging unit(s)
Alternator stack for power generation
Flight motor
LIPO+Li-ion batteries
USB charge port
Male interlock
Female interlock
Male power and systems interface
Female power and systems interface
Ducted fan release button
Charge controller
Tripod mount
High output LED array
Antenna
Expandable wind blades
Passive concentricity mechanism for wind blades
Planetary gear assembly 5:1 ratio
LED
GPS module
Duct restraint mechanism
Flight controller (PCB, SBC, MCU, CPU, processor, embedded flash/memory card with software commands for the different flight operations)
Communications+controls transmitter+receiver
Male blade to blade coupling
Female blade to blade coupling Vehicle management control housing (also referred as the "vehicle management control unit")

Autonomous flight control interface (also referred to as the "autonomous flight interface" or the "autonomous flight selection interface")

The various elements of the self-charging modular portable survival drone that recharges by natural elements of the present disclosure may be related in the following exemplary fashion. It is not intended to limit the scope or nature of the relationships between the various elements and the following examples are presented as illustrative examples only.

The first configuration of the self-charging modular portable survival drone noted above is the assembled carry configuration. In the assembled carry configuration, four ducted fans and charging units are interlocked using both male interlocks and female interlocks, which keep the ducted fans aligned. A passive concentricity mechanism for wing blades locks into place on one end of the ducted fans and a planetary gear assembly locks into the other end. The vehicle management control unit locks into place with the planetary gear assembly. Five expandable wing blades lock into place to complete the assembly of the self-charging modular portable survival drone in the carry configuration. When the ducted fans and charging units are aligned, the male blade to blade couplings lock with the female blade to blade couplings located inside each ducted fan. Also, the alternator stacks are mounted behind the flight motors. As such, this enables the shafts located within each flight motor to engage the alternator stack for power generation. A self-charging modular portable survival drone in the assembled carry configuration is demonstrated and described further below, by reference to FIG. 1.

The second configuration of the self-charging modular portable survival drone noted above is the wind charging configuration. The wind charging configuration is possible by reconfiguring the carry configuration. Specifically, reconfiguring the self-charging modular portable survival drone from the carry configuration to the wind configuration involves expanding the expandable wind blades and mounting the self-charging modular portable survival drone assembly to a tripod. This is accomplished by connecting the tripod to the tripod mount of the vehicle management control unit (e.g., by screwing a tripod plate screw into the tripod mount). Once the wind blades are open and the self-charging modular portable survival drone is mounted to the tripod, the assembly is oriented with the vehicle management control unit attached at the bottom to the trip and the wind blades open above the vehicle management control unit. A self-charging modular portable survival drone in the wind charging configuration is demonstrated and described further below, by reference to FIG. 5.

The third configuration of the self-charging modular portable survival drone noted above is the water charging configuration. When moving water is the choice for remote charging, the self-charging modular portable survival drone assembly is stripped down to four assembled ducted fans and charging units. In other words, reconfiguring the self-charging modular portable survival drone for the water charging configuration involves removing the vehicle management control unit, the planetary gear assembly, and the passive concentricity mechanism from the assembly, leaving only the four assembled ducted fans and charging units interconnected to each other. Also, each ducted fan and charging unit includes a universal serial bus ("USB") charge port (also referred to a "USB port") which is powered by a group of LIPO and Li-ion batteries managed by an onboard integrated circuit (IC) charge controller. A self-charging modular portable survival drone in the water charging configuration is demonstrated and described further below, by reference to FIG. 4.

The fourth configuration of the self-charging modular portable survival drone noted above is the rescue drone configuration. In the event of an emergency, the four ducted fans and charging units interlock to the vehicle management control unit via the duct restraint mechanism—that is, ducted fan locking arms of the vehicle management control unit lock into the duct restraint locks of the ducted fans and charging units to keep the ducted fans and charging units secured to the vehicle management control unit. Each ducted fan and charging unit includes a female power and system interface. The vehicle management control unit includes four male power and system interfaces. When secured together via the duct restraint mechanism, the female power and system interface of each ducted fan and charging unit engages with its mating male power and system interface located on the vehicle management control unit. This assembles the self-charging modular portable survival drone into the rescue drone configuration. Furthermore, the vehicle management control unit includes several components that operate in the rescue drone configuration, namely, a high output LED array, (other) LEDs, a GPS module, an electronic system controller ("flight controller"), communications devices that are communicably connected to the flight controller (that is, communications+controls transmitter+receiver), an autonomous flight control interface, and an antenna for sending and receiving communications, signals, and data via the communications device. These components operate when the self-charging modular portable survival drone is assembled into the rescue drone configuration to support the flight and rescue operations of the drone. To reconfigure the self-charging modular portable survival drone into a different configuration, the vehicle management control unit includes ducted fan release buttons located along a top surface to disengage the four ducted fans and charging units from the vehicle management control unit. A self-charging modular portable survival drone in the rescue drone configuration is demonstrated and described further below, by reference to FIG. 2.

The self-charging modular portable survival drone that recharges by natural elements of the present disclosure works in the following way. Each of the ducted fans and charging units include a charge controller (IC) and a power storage system to self-charge onboard batteries (LIPO and Li-ion batteries). To effectively and effortlessly charge the self-charging modular portable survival drone, the four ducted fans and charging units can be interlocked so that the shafts/props are coupled with each other. The assembly of interlocked ducted fans and charging units can be submerged into a body of moving water which will rotate the fans. The rotating fans, in turn, rotate the alternators about the stators which generate AC current. The power is converted to DC and the power is stored within onboard LIPO and Li-ion batteries. Each of the four ducted fans and charging units have an onboard USB charging port to allow for personal device charging.

The four interlocked ducted fans and charging units can be paired with a passive concentricity unit and a planetary gear unit along with five (or more) wind blades and the vehicle management control unit. With the addition of these components, the self-charging modular portable survival drone can be mounted to a tripod, or left unmounted, and used as a vertical wind power generator that will charge the batteries and the onboard power systems located in the ducted fans and charging units. The tripod for the vehicle management control unit in some embodiments is a standard tripod female threaded insert to provide the user with a convenient way to mount the wind unit to a screw plate of a tripod. The size of the tripod's mounting plate screw would need to conform to the size of the threaded insert (such as ¼ inch, ⅜ inch, or other matching size) or an adapter could be applied. On the other hand, it is not required to attach the self-charging modular portable survival drone to a tripod in the wind charging configuration.

In the event of an emergency, a person would lock the four ducted fans and charging units into place with the vehicle management control unit. When in this 'rescue drone' configuration, the self-charging modular portable survival drone would need to have sufficient battery charge to power flight and control operations. Assuming there is sufficient battery charge, the self-charging modular portable survival drone would be ready to take flight. Beyond merely flying, the self-charging modular portable survival drone can be configured to run a pre-programmed flight 'envelope' that controls flight operation and output devices, such as LEDs, communication signaling, etc. In some embodiments, an autonomous flight control interface is disposed along an exterior surface of the vehicle management control unit. Through the autonomous flight control interface, the person would be able to select one of the pre-programmed flight envelopes, depending on the severity of the emergency/situation. In some embodiments, the pre-programed flight envelopes correspond to buttons along the autonomous flight control interface. In some embodiments, the buttons include LED lights to indicate a current selection of any given button. The pre-programmed flight envelopes (which correspond to the buttons of the autonomous flight control interface) range from no-flight LED lights only for hand-held SOS broadcasting to 500 ft, 1000 ft, and 2000 ft sustained flight hover modes for SOS search and rescue GPS broadcast and LED visual detection. The pre-programmed flight envelopes include a return to home command that uses the first GPS coordinates obtained when a particular flight envelope is selected. Further details of the autonomous flight control interface and the pre-programmed flight envelopes of a self-charging modular portable survival drone in the rescue drone configuration are described below, by reference to FIGS. 2, 6, and 10. After safe retrieval of the drone, the water and wind charging assemblies can be recreated to re-charge to the four ducted fans and charging units for repetitive SOS flight operations or personal electronics charging.

To use the self-charging modular portable survival drone of the present disclosure, a person (often referred to as the "user", above) would need to ensure there is sufficient power to operate as a survival drone or as a power charging station to charge other devices (such as mobile phones, flashlights, etc.). When the remaining charge in the batteries is low or completely drained, the user would reconfigure the self-charging modular portable survival drone into a charging configuration (either the wind charging configuration of the water charging configuration, both of which are described further below). When done properly, the charging configuration would provide the onboard batteries with power to operate and charge other devices. To operate the self-charging modular portable survival drone in flight/survival mode, the user reconfigures the current charging configuration of the self-charging modular portable survival drone into the survival drone configuration (which is described further below) and then select a type of pre-programmed flight program that causes the self-charging modular portable survival drone to signal for help using onboard high output LED lights, the GPS unit, and other onboard communication systems/devices. After the batteries are depleted of power, the user can reconfigure the self-charging modular portable survival drone back into one of the charging configurations to recharge the batteries.

To reconfigure the self-charging modular portable survival drone into a wind charging station (wind charging configuration) a person would assemble the four ducted fans and charging units together by engaging and interlocking the male and female blade couplings together. The configuration of the interlocks on the ducted fans and charging units prevents incorrect assembly (e.g., trying to connect them in the wrong order and/or wrong orientation). After the ducted fans and charging units are assembled and interconnected, the rotation of blades in one ducted fan and charging unit would result in movement of the blades for the other three ducted fans and charging units. Also, the passive concentricity unit can be attached at one end, while the planetary gear unit would be installed at the other end. Then, the vehicle management control unit would be attached to the planetary gear unit. The final step in reconfiguring the self-charging modular portable survival drone into the wind charging configuration involves adding (and opening) the five expandable wind blades.

To reconfigure the self-charging modular portable survival drone into a water charging station (water charging configuration), the vehicle management control unit, the passive concentricity unit, the planetary gear unit, and the five wind blades are removed from the self-charging modular portable survival drone (in the wind charging configuration). This leaves only the four interlocked ducted fans and charging units. On the other hand, when the components of the self-charging modular portable survival drone are entirely disassembled, a person would just select all four of the ducted fans and charging units and connect them together, without any other components.

To reconfigure the self-charging modular portable survival drone into the survival drone configuration, the four ducted fans and charging units would be secured to the vehicle management control unit. The vehicle management control unit includes four power and system interfaces. Accordingly, only a single ducted fan and charging unit can be secured to a given power and system interface at any given time. In other words, there is no way to chain a series of ducted fans and charging units to a first ducted fan and charging unit that is secured to one of the power and system interfaces of the vehicle management control unit. However, all four of the ducted fans and charging units can be directly secured to the vehicle management control unit—each ducted fan and charging unit being secured to one of the four power and system interfaces of the vehicle management control unit. Also, the autonomous flight control interface-which allows the user to make a selection of a flight mode (or pre-programmed flight envelope)—is located along a part of the outer surface of the vehicle management control unit that is not obstructed by any ducted fan and charging unit secured to the power and system interfaces. Accordingly, it is possible for the user to interact with the autonomous flight selection interface to select a flight mode depending on the emergency situation, and thereby initiate flight for the survival drone.

To reconfigure the self-charging modular portable survival drone into the carry configuration, the user would just interlock all of the components together and ensure that the wind blades are closed/collapsed so that the entire assembly can be safely packed and carried (almost like a baton or wand).

By way of example, FIG. 1 conceptually illustrates a perspective view of a self-charging modular portable survival drone in a carry configuration 100. As shown in this figure, the self-charging modular portable survival drone in the carry configuration 100 comprises a vehicle management control unit 110, a communications antenna 120 (or simply "antenna 120"), a plurality of male power and system interfaces 130 with male power and system interface pins, a plurality of ducted fan and charging unit release buttons 140, a plurality of ducted fan locking arms 150, a plurality of male interlocks 160, a planetary gear assembly 170, a passive concentricity mechanism 180, and a plurality of expandable wind blades 190.

The plurality of ducted fan locking arms 150 are used to secure ducted fans and charging units to the vehicle management control unit 110 for flight mode (or rescue drone configuration, which is described next, by reference to FIG. 2). Specifically, the plurality of ducted fan locking arms 150 extend out of and retract into the male power and system interfaces 130 by operation of the ducted fan and charging unit release buttons 140.

The expandable wind blades 190 connect at one end to the planetary gear assembly 170 and at the other end to the passive concentricity mechanism 180. Also, in the carry configuration 100, the expandable wind blades 190 are closed. Because the expandable wind blades 190 are closed in the carry configuration 100, several other components of the self-charging modular portable survival drone are not visible in this figure. The other components are described further below, by reference to FIGS. 3-5. Before describing the configurations of the self-charging modular portable survival drone demonstrated in those figures, however, a rescue drone configuration of the self-charging modular portable survival drone is described next, by reference to FIG. 2.

Figure 2:
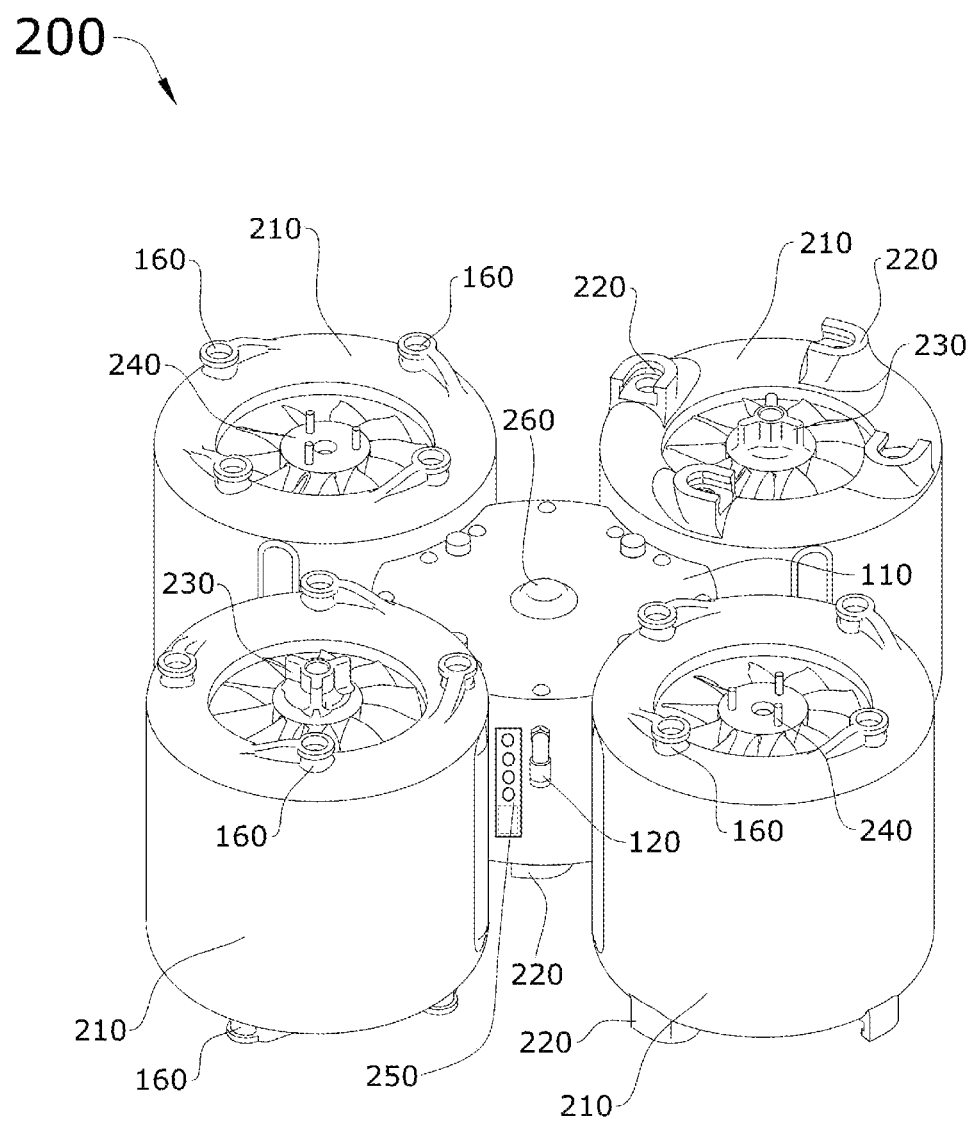
FIG. 2 conceptually illustrates a perspective view of the self-charging modular portable survival drone of some embodiments in a drone configuration.

Specifically, FIG. 2 conceptually illustrates a perspective view of the self-charging modular portable survival drone in the rescue drone configuration 200. As shown in this figure, the self-charging modular portable survival drone in the rescue drone configuration 200 comprises the vehicle management control unit 110, the antenna 120, and the plurality of male interlocks 160 (all of which are shown in FIG. 1). Additionally, the self-charging modular portable survival drone in the rescue drone configuration 200 comprises a plurality of ducted fans and charging units 210, a plurality of female interlocks 220, a plurality of male blade-to-blade couplers 230, a plurality of female blade-to-blade couplers 240, an autonomous flight control interface 250, and a tripod mount 260.

In this figure, the plurality of ducted fans and charging units 210 are secured to the vehicle management control unit 110. Specifically, each ducted fan and charging unit 210 connects to a male power and system interface 130 along an exterior surface of the vehicle management control unit 110. The ducted fan locking arm 150 of each male power and system interface 130 retracts when the corresponding ducted fan and charging unit release button 140 is depressed, thereby allowing one of the ducted fans and charging units 210 to be connected and, when the ducted fan locking arm 150 is extended by release of the ducted fan and charging unit release button 140, the ducted fan and charging unit 210 is secured to the vehicle management control unit 110. This is accomplished by ducted fan locking restraints (or "duct restraint locks") of corresponding female power and system interfaces the ducted fans and charging units 210, into which the ducted fan locking arms 150 extend when the ducted fan and charging unit release buttons 140 are let go (released). Details of the ducted fan locking restraints and the female power and system interfaces are described further below, by reference to FIG. 3.

The antenna 120 and the autonomous flight control interface 250 shown in this figure are disposed along the exterior surface of the vehicle management control unit 110. In some embodiments, the antenna 120 is configured to transmit and receive communications, data communications or otherwise. In some embodiments, the antenna 120 is communicably connected to an embedded communications module or multiple communications devices embedded within the vehicle management control unit 110. In some embodiments, the autonomous flight control interface 250 is an interactive interface that allows a user to select different flight programs for operations in various configurations. Further details of various flight programs and user-selectable buttons of the autonomous flight control interface 250 are described below.

While the antenna 120 was described above, by reference to FIG. 1, the autonomous flight control interface 250 and the tripod mount 260 are not shown in the vehicle management control unit 110 of FIG. 1, but are shown in the vehicle management control unit 110 of this figure. The inclusion and description of the autonomous flight control interface 250 and the tripod mount 260 in connection with FIG. 2 is not meant to suggest that the autonomous flight control interface 250 and the tripod mount 260 are not included as components of the self-charging modular portable survival drone in the carry configuration 100 (or only included as components of the self-charging modular portable survival drone in the rescue drone configuration 200). Instead, the description of these components is provided here in relation to descriptions below in which the self-charging modular portable survival drone can be mounted to a drone (specifically, the self-charging modular portable survival drone in a wind charging configuration as described below, by reference to FIG. 5) and in connection to descriptions of flight programming and SOS communications programming when the self-charging modular portable survival drone is configured for SOS rescue operations.

As noted above, the autonomous flight control interface 250 allows a user to select buttons related to specific flight programs. As shown in this figure, the autonomous flight control interface 250 includes at least four buttons. In some embodiments, the autonomous flight control interface 250 is communicably connected to an embedded controller, referred to as a flight controller. In some embodiments, the flight controller is configured to receive commands corresponding to user selections of the various buttons along the autonomous flight control interface 250. Each command corresponding to a button is a command to load a particular flight program among a plurality of flight programs stored internally in the vehicle management control unit 110.

In some embodiments, the plurality of flight programs comprises a first flight program that carries out operations of an emergency SOS drone flight program. In some embodiments, the emergency SOS drone flight program is configured to establish home coordinates of the self-charging modular portable survival drone, activate LED light signaling, fly the drone to a certain elevation, broadcast SOS signals over wireless communication channels, and fly the drone down to the home coordinates location when power of the drone is getting low.

In some embodiments, the plurality of flight programs comprises a second flight program that carries out an emergency SOS light signaling program. In some embodiments, the emergency SOS light signaling program is configured to output light with strobe or flashing effects in an SOS light signaling pattern, without flying the drone. In some embodiments, the emergency SOS light signaling program can be configured to output light with strobe/flashing effects to provide a flashlight option.

Additional details of the flight programs and the plurality of buttons along the autonomous flight control interface 250 are described below, by reference to FIG. 10.

Figure 3:
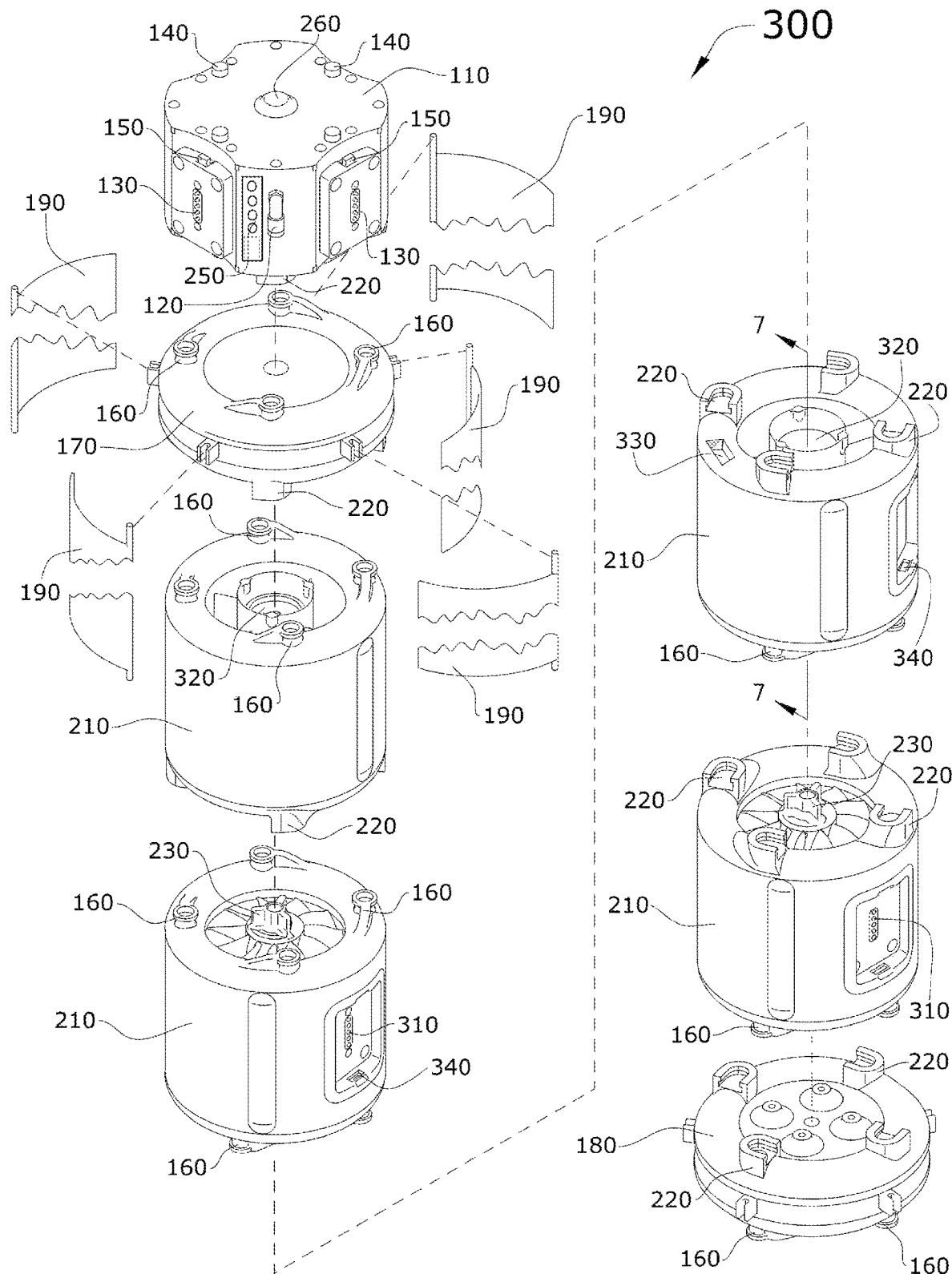
FIG. 3 conceptually illustrates an exploded view of the self-charging modular portable survival drone in some embodiments.

Now, turning to another example, FIG. 3 conceptually illustrates an exploded view of the self-charging modular portable survival drone and all its components 300 arranged in the carry configuration or the wind charging configuration. As shown in this figure, the self-charging modular portable survival drone and all its components 300 comprises the vehicle management control unit 110, the antenna 120, the plurality of male power and system interfaces 130, the plurality of ducted fan and charging unit release buttons 140, the plurality of ducted fan locking arms 150, the plurality of male interlocks 160, the planetary gear assembly 170, the passive concentricity mechanism 180, the plurality of expandable wind blades 190, the plurality of ducted fans and charging units 210, the plurality of female interlocks 220, the plurality of male blade-to-blade couplers 230, the autonomous flight control interface 250, the tripod mount 260, a plurality of female power and system interfaces 310 with female power and system interface pins, a plurality of power generation alternators 320, a USB charge port 330, and a plurality of ducted fan locking restraints 340.

While the USB charge port 330 is the lone USB port shown in this figure, embodiments of the self-charging modular portable survival drone includes a plurality of USB ports. Specifically, in some embodiments, each ducted fan and charging unit 210 includes a USB port 330.

This arrangement of components for the self-charging modular portable survival drone is suitable for the carry configuration and the wind charging configuration, and partly suitable for the water charging configuration. Specifically, the arrangement of components for the self-charging modular portable survival drone shown in this figure starts with the vehicle management control unit 110, which is connected above the planetary gear assembly 170 by securing the plurality of female interlocks 220 of the vehicle management control unit 110 to the plurality of male interlocks 160 of the planetary gear assembly 170. As noted above, the plurality of expandable wind blades 190 connect to the planetary gear assembly 170. Also, the planetary gear assembly 170 connects to a first ducted fan and charging unit 210. Again, the connection mechanism involves securing the plurality of female interlocks 220 of the planetary gear assembly 170 to the plurality of male interlocks 160 of the first ducted fan and charging unit 210. Then a second ducted fan and charging unit 210 is connected to the bottom of the first ducted fan and charging unit 210. In this case, the second ducted fan and charging unit 210 includes a plurality of male interlocks 160 along a top surface and another plurality of male interlocks 160 along its bottom surface. Thus, the plurality of female interlocks 220 of the first ducted fan and charging unit 210 are secured to the plurality of male interlocks 160 along the top surface of the second ducted fan and charging unit 210. Then the plurality of male interlocks 160 along the bottom surface of the second ducted fan and charging unit 210 are secured to a plurality of female interlocks 220 of a third ducted fan and charging unit 210. Next, a plurality of male interlocks 160 of the third ducted fan and charging unit 210 are secured to a plurality of female interlocks 220 of the final ducted fan and charging unit 210. Then the final ducted fan and charging unit 210 is secured to the passive concentricity mechanism 180 by connecting the plurality of male interlocks 160 of the final ducted fan and charging unit 210 to a plurality of female interlocks 220 of the passive concentricity mechanism 180.

While this example in FIG. 3 demonstrates a specific order of interlocking the components, it should be noted that the interlocking of components can exclude specific components to achieve a specific type of configuration. This would be accomplished interlocking the components needed for the specific configuration. This is described next, by reference to FIG. 4, in an example that demonstrates a water charging configuration.

Figure 4:
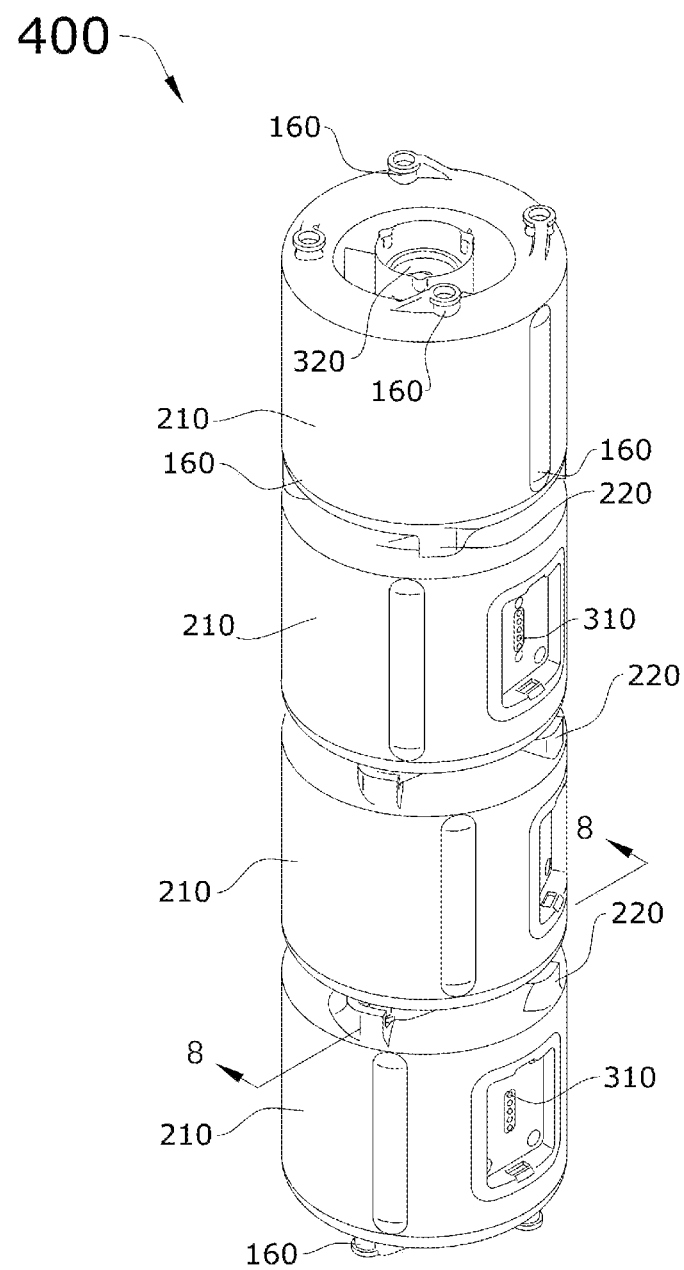
FIG. 4 conceptually illustrates a perspective view of the self-charging modular portable survival drone of some embodiments in a water charge configuration.

Specifically, FIG. 4 conceptually illustrates a perspective view of the self-charging modular portable survival drone in a water charging configuration 400. As shown in this figure, the self-charging modular portable survival drone in the water charging configuration 400 comprises a plurality of ducted fans and charging units 210 connected to each other in series. Specifically, the first ducted fan and charging unit 210 connects to the second ducted fan and charging unit 210. The second ducted fan and charging unit 210 connects, in turn, to the third ducted fan and charging unit 210. Finally, the third ducted fan and charging unit 210 connects to the final ducted fan and charging unit 210. The interlocking of these components occurs as described above, by reference to FIG. 3. Specifically, the plurality of female interlocks 220 of the first ducted fan and charging unit 210 are secured to the plurality of male interlocks 160 along the top surface of the second ducted fan and charging unit 210 and the other plurality of male interlocks 160 along the bottom of the second ducted fan and charging unit 210 are secured to the plurality of female interlocks 220 of the third ducted fan and charging unit 210. The water charging configuration is completed by securing the plurality of male interlocks 160 of the third ducted fan and charging unit 210 to the plurality of female interlocks 220 of the final ducted fan and charging unit 210.

Left out of this water charging configuration is the vehicle management control unit 110, the planetary gear assembly 170, and the passive concentricity mechanism 180. This allows the self-charging modular portable survival drone in the water charging configuration 400 to be submerged in flowing water to generate power that recharges internal batteries of the self-charging modular portable survival drone. Specifically, when submerged in flowing water, the power generation alternators 320 of the ducted fans and charging units 210 are oriented in a manner in which the force of the water movement causes the alternator 320 to generate power. The water flows through all of the ducted fans and charging units 210 and bladed units of the self-charging modular portable survival drone in the water charging configuration 400 until flowing out of the end of the final ducted fan and charging unit 210.

Figure 5:
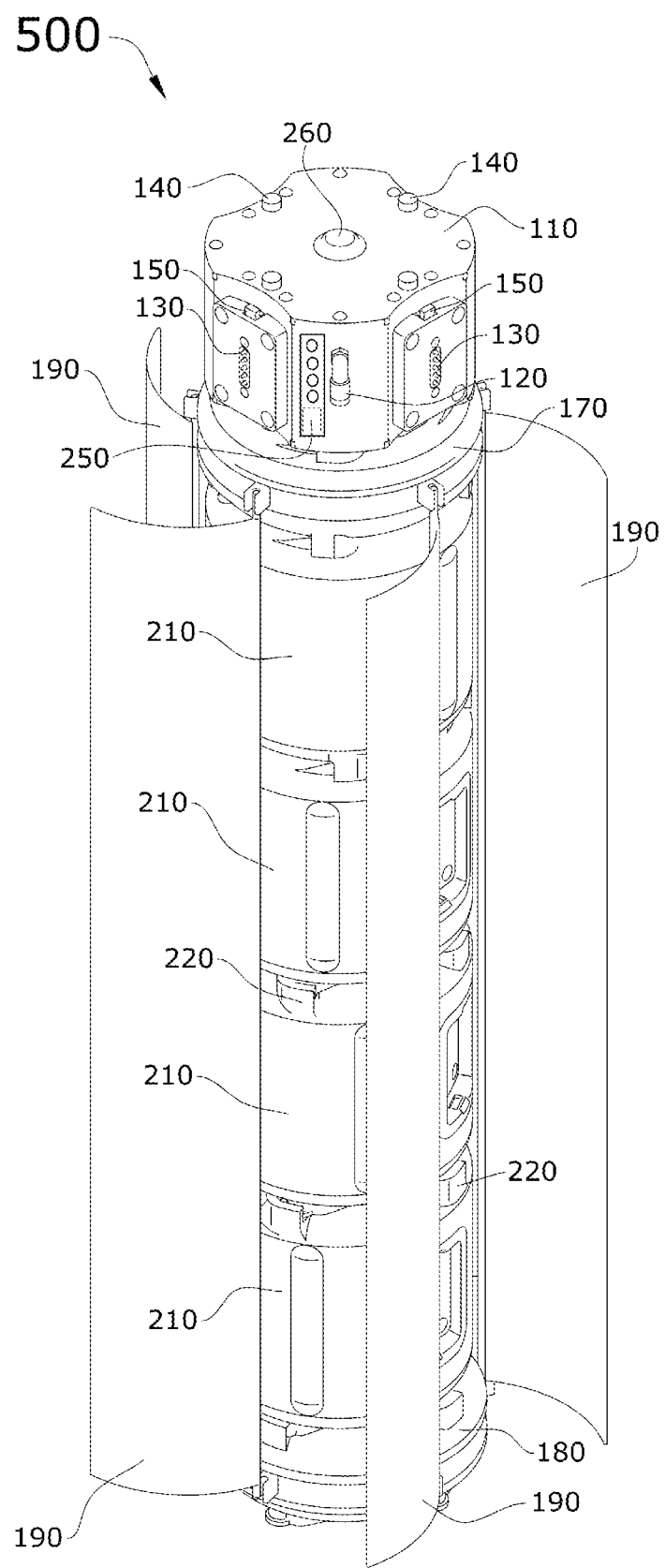
FIG. 5 conceptually illustrates a perspective view of the self-charging modular portable survival drone of some embodiments in a wind charge configuration.

Now turning to FIG. 5, which conceptually illustrates a perspective view of the self-charging modular portable survival drone in the wind charging configuration 500. As shown in this figure, the self-charging modular portable survival drone in the wind charging configuration 500 is arranged in the manner described above, by reference to FIG. 3. Specifically, the plurality of expandable wind blades 190 of the self-charging modular portable survival drone in the wind charging configuration 500 are shown open in a way that can capture wind/air movement. This is unlike the self-charging modular portable survival drone in the carry configuration 100, described above by reference to FIG. 1, in which the plurality of expandable wind blades 190 are closed.

In this wind charging configuration 500, the expandable wind blades 190 would be forced by wind/air movement to move in a direction. When there is sufficient wind/air movement, this causes the entire assembly of the four ducted fans and charging units 210 to spin concentrically around (rotate), as allowed by the planetary gear assembly 170 and the passive concentricity mechanism 180.

Also, while not shown in this figure, the self-charging modular portable survival drone in the wind charging configuration 500 can be mounted to a tripod by connecting the tripod (screw plate) to the tripod mount 260 and setting the tripod to desired height. In this way, the self-charging modular portable survival drone in the wind charging configuration 500 may expose the plurality of expandable wind blades 190 to more wind/air movement than a different height or ground level. On the other hand, the self-charging modular portable survival drone in the wind charging configuration 500 need not be mounted on a tripod since the self-charging modular portable survival drone in the wind charging configuration 500 could be set up as a free-standing unit that is placed on the ground, a rock, a boulder, in a tree, etc. When set up as a free-standing unit, the self-charging modular portable survival drone in the wind charging configuration 500 could still capture wind/air movement in the expandable wind blades 190, provided that the strength of force of the wind/air movement is not sufficient to blow over the entire free-standing self-charging modular portable survival drone in the wind charging configuration 500.

The rescue drone configuration 200, described above by reference to FIG. 2, is demonstrated from another perspective in FIG. 6, which is described next. Specifically, FIG. 6 conceptually illustrates a bottom perspective view of the self-charging modular portable survival drone with a light emitting diode (LED) array for visual rescue signaling 600. As shown in this figure, the self-charging modular portable survival drone includes a high output LED array 610 which is configured to output SOS light signals according to a flight program for the drone.

Figure 7:
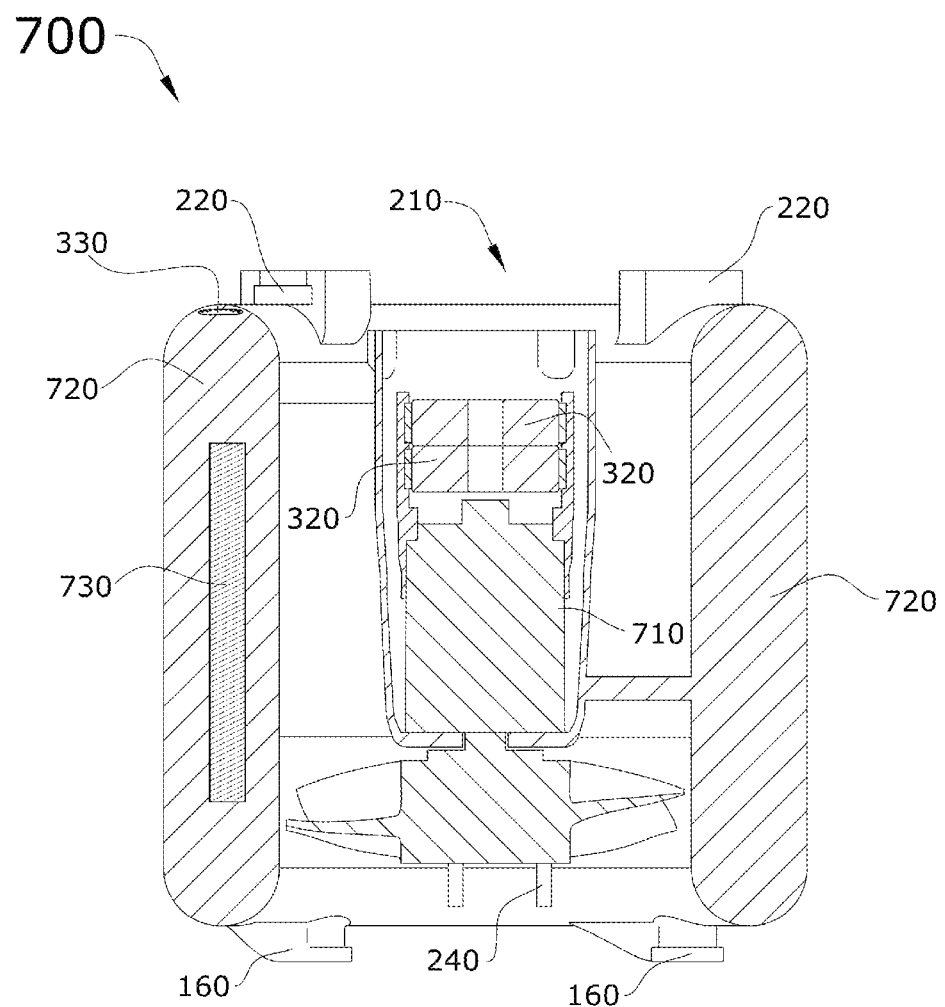
FIG. 7 conceptually illustrates a section view of the self-charging modular portable survival drone taken along line 7-7 in FIG. 3.

Descriptions of the next several figures focus on embedded and/or internal components within the several components described above. By way of a first internal components example, FIG. 7 conceptually illustrates a section view of a ducted fan and charging unit of the self-charging modular portable survival drone 700 taken along line 7-7 in FIG. 3. As shown in this figure, the ducted fan and charging unit 210 includes exterior components such as the plurality of male interlocks 160, the plurality of female interlocks 220, the plurality of female blade-to-blade couplers 240, the plurality of power generation alternator 320, and the USB charge port 330. Furthermore, the ducted fan and charging unit 210 includes several internal or embedded components comprising a flight motor 710, a plurality of batteries 720 (LIPO and/or Li-ion batteries), and a charge controller 730.

Figure 8:
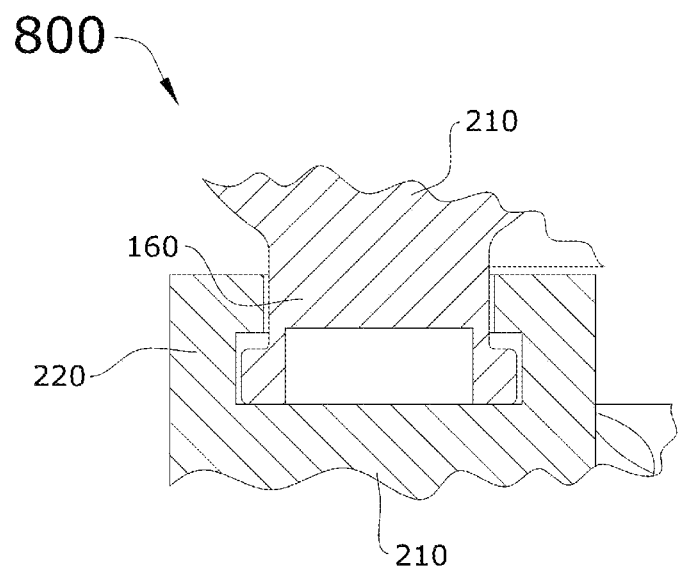
FIG. 8 conceptually illustrates a detailed section view of the self-charging modular portable survival drone taken along line 8-8 in FIG. 4.

Demonstrating a detailed view of the interlocking mechanism involved in securing the components together in the water charging configuration, the wind charging configuration, and the carry configuration, FIG. 8 conceptually illustrates a detailed section view of the interlocking mechanism 800 for the ducted fans and charging units 210 of a self-charging modular portable survival drone taken along line 8-8 in FIG. 4. The ducted fans and charging units 210 shown in this figure are interlocked by securing the male interlock 160 to the female interlock 220, as arranged in accordance with the carry configuration 100 described above by reference to FIG. 1, the water charging configuration 400 described above by reference to FIG. 4, and the wind charging configuration 500 described above by reference to FIG. 5.

Figure 6:
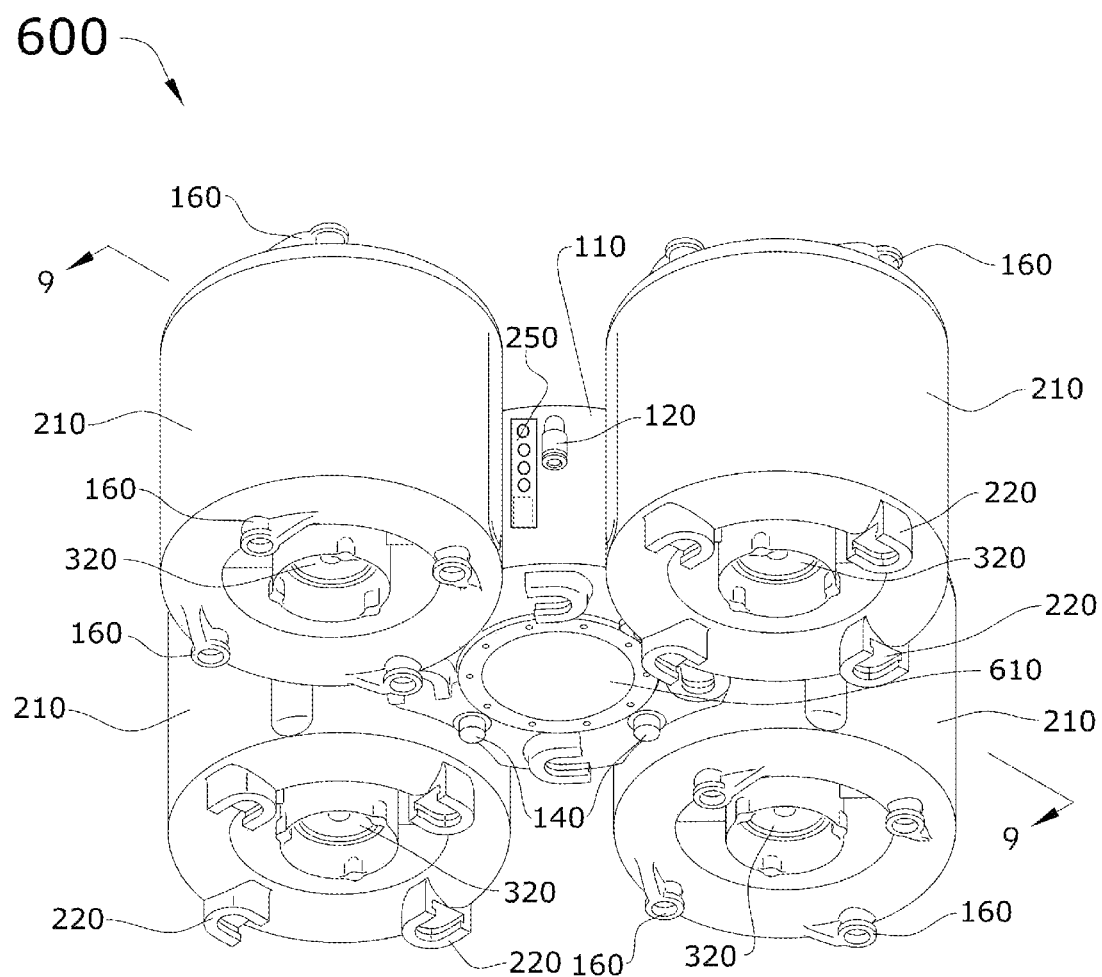
FIG. 6 conceptually illustrates a bottom perspective view of the self-charging modular portable survival drone in some embodiments.
Figure 9:
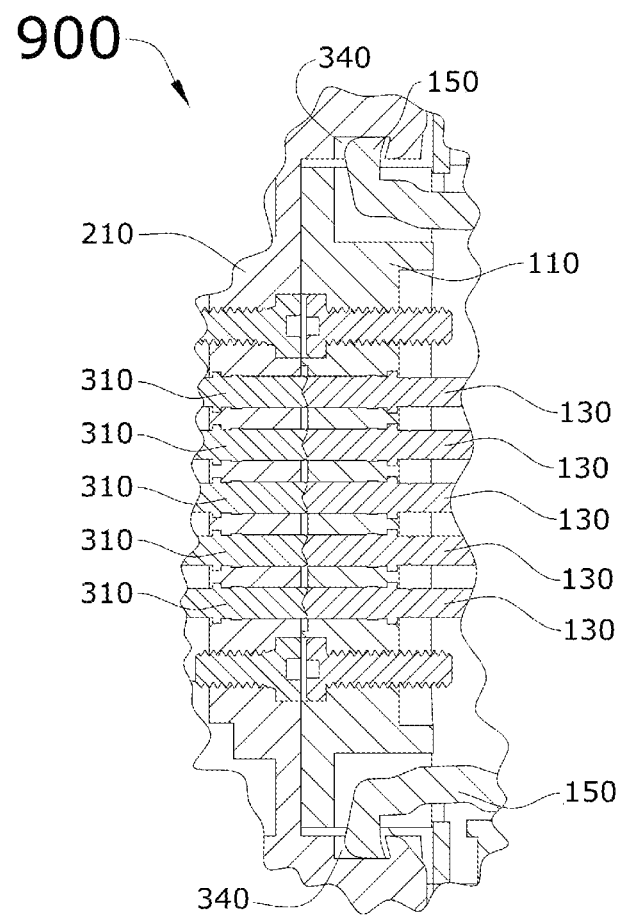
FIG. 9 conceptually illustrates a detailed section view of the self-charging modular portable survival drone taken along line 9-9 in FIG. 6.

Demonstrating another detailed aspect of the arrangement of components for the rescue drone configuration (and which could be configured for external device recharging), FIG. 9 conceptually illustrates a detailed section view of the power and system interface pins 310 of a ducted fan and charging unit 210 mated to the power and system interface pins 130 of the vehicle management control unit 110 of the self-charging modular portable survival drone, as taken along line 9-9 in FIG. 6. Also shown in this figure is a demonstration of how the ducted fan locking arms 150 extend into the ducted fan locking restraints 340 to secure the ducted fan and charging unit 210 to the vehicle management control unit 110.

Figure 10:
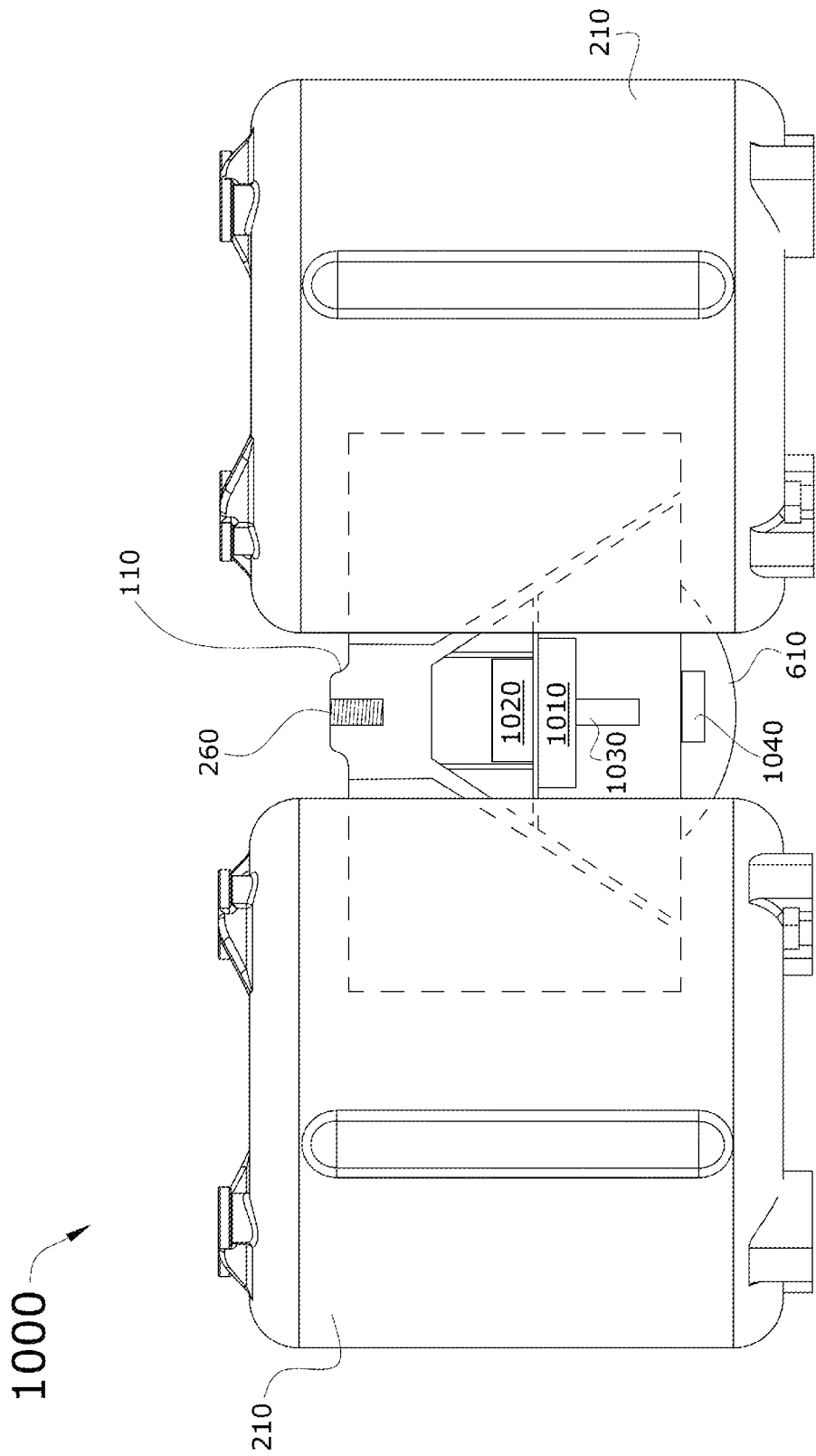
FIG. 10 conceptually illustrates internal control components of a management control unit of the self-charging modular portable survival drone of some embodiments in the drone configuration.

In yet another example, FIG. 10 conceptually illustrates internal control components of a vehicle management control unit 110 of the self-charging modular portable survival drone 1000 arranged in the rescue drone configuration. As shown in the figure, two visible ducted fans and charging units 210 are secured to the vehicle management control unit 110 in the rescue drone configuration. Components of the vehicle management control unit 110 include the tripod mount 260, the high output LED array 610, an electronic system controller 1010 (referred to as the "flight controller 1010"), a communications module 1020, a storage device 1030, and a global positioning system (GPS) module 1040. The inlet point of the tripod mount 260 and the high output LED array 610 are visible from an external viewpoint while the internal control components of the vehicle management control unit 110, namely, the flight controller 1010, the communications module 1020, the storage device 1030, and the GPS module 1040, are embedded within the vehicle management control unit 110 and would not be visible from any such external viewpoint. Thus, their illustration in this figure are intended as representational to demonstrate their existence within the vehicle management control unit 110.

Also, while the inlet point of the tripod mount 260 is externally visible, the tripod mount 260 shown in this figure demonstrates an internal view of the tripod mount 260 in which a threaded inlet is provided to enable a tripod plate screw to secure a tripod to the vehicle management control unit 110. This would normally not occur in the rescue drone configuration, but instead, would typically occur in the wind charging configuration).

In some embodiments, the flight controller 1010 is a processing unit (such as a processor of a PCB, a processor of a SBC, a program execution module of a MCU, a central processing unit (CPU) of another computing device, or any other electronic system processor or processing unit). Operationally, the flight controller 1010 carries out flight operations according to various flight programs (referred to above as "pre-programmed envelopes"). In some embodiments, the communications module 1020 is communicably connected to the antenna 120 and is configured to transmit and receive data and other communications. In some embodiments, the communications module 1020 comprises a combination of communications devices that support wireless data communications, emergency broadcast radio signal and data communications, etc. In some embodiments, the storage device 1030 provides non-volatile data storage. In some embodiments, the storage device 1030 comprises an embedded non-volatile data storage, such as a solid-state drive (SSD) or a hard disk drive (HDD). In some embodiments, the storage device 1030 comprises a removable non-volatile data storage, such as a memory card of flash drive. In some embodiments, the GPS module 1040 is configured to receive location data from multiple GPS satellites and calculate home coordinates of the present location of the self-charging modular portable survival drone 1000.

In some embodiments, the flight controller 1010 is communicably connected to the autonomous flight control interface 250 and is configured to receive commands corresponding to user selections of the various buttons along the autonomous flight control interface 250. Each command corresponding to a button is a command to load a particular flight program among a plurality of flight programs stored in the storage device 1030.

In some embodiments, a first button of the autonomous flight control interface 250 corresponds to a first command to load a first flight program from the storage device 1030. In some embodiments, the first flight program is an emergency SOS drone flight program. In some embodiments, the emergency SOS drone flight program comprises (i) establishing home coordinates by the GPS module 1040, (ii) activating the high output LED array 610 to shine the LEDs in an SOS signaling pattern, (iii) flying the drone to an approximate elevation above the location of the home coordinates and hovering at the elevation (until battery power is low), (iv) broadcasting, by the communications module 1020 and by way of the antenna 120, a distress signal and the home coordinates over one or more emergency broadcast radio bands, while continuing to output the SOS signaling pattern by the high output LED array 610, and (v) flying down and landing the drone at the location of the home coordinates when the battery power is low. Then the batteries of the self-charging modular portable survival drone 1000 can be recharged (e.g., in the water charging configuration or the wind charging configuration). In some embodiments, the elevation to which to fly and hover the self-charging modular portable survival drone 1000 is programmable. Thus, the elevation may be programmed to fly and hover at any height, e.g., 500 feet, 1000 feet, 2000 feet, 2000+ feet, etc.

In some embodiments, a second button of the autonomous flight control interface 250 corresponds to a second command to load a second flight program from the storage device 1030. In some embodiments, the second flight program is an emergency SOS light signaling program. In some embodiments, the emergency SOS light signaling program outputs light with strobe or flashing effects in an SOS light signaling pattern. In some embodiments, the emergency SOS light signaling program does not involve flying or hovering the self-charging modular portable survival drone 1000. In some embodiments, the emergency SOS light signaling program provides a flashlight option in which high intensity light is continuously output by the high output LED array 610 with no strobe or flashing effects.

In some embodiments, the autonomous flight control interface 250 comprises a third button and a fourth button that can be set for custom programming provided by the user. In some embodiments, custom programming can be provided through a USB connection to an external device in which a custom program is uploaded to the flight controller 1010 of the self-charging modular portable survival drone 1000 and stored in the storage device 1030.

The self-charging modular portable survival drone described above can be used as directed to create a unified self-charging system, with a USB port 330 at each ducted fan and charging unit 210 allowing for charging of consumer electronics (e.g., 5V 1 Amp charging, etc.). When the rescue drone configuration is assembled for the self-charging modular portable survival drone, the high output LED array 610 can be used as a flashlight (instead of a being used as a flying/hovering SOS signaling drone), thereby giving the user a self-charging high-output flashlight as an optional configuration. In some embodiments, the self-charging modular portable survival drone comprises additional components including an electrical spark lighter. The electrical spark lighter enables a user to start a fire, for example. In some embodiments, the electrical spark lighter makes use of the battery power available from all four of the ducted fans and charging units 210.

Additionally, the self-charging modular portable survival drone can be adapted for use as a personal fan when set up in the survival drone configuration. Specifically, the blades connected to the male blade-to-blade couplers 230 and the female blade-to-blade couplers 240 could operate to flow air like a fan. Similarly, the self-charging modular portable survival drone could be adapted to provide a thrust mechanism in aquatic settings, again by action of the blades connected to the male and female blade-to-blade couplers. Also, the self-charging modular portable survival drone need not be used only in survival situations or at remote locations but, instead, can be utilized as a recreational device, or hobby drone (toy) that is powered, charged, and recharged by natural elements, such as wind and water.

Many of the above-described features and applications are implemented as software processes that are specified as a set of instructions recorded on a computer readable storage medium (also referred to as computer readable medium or machine-readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
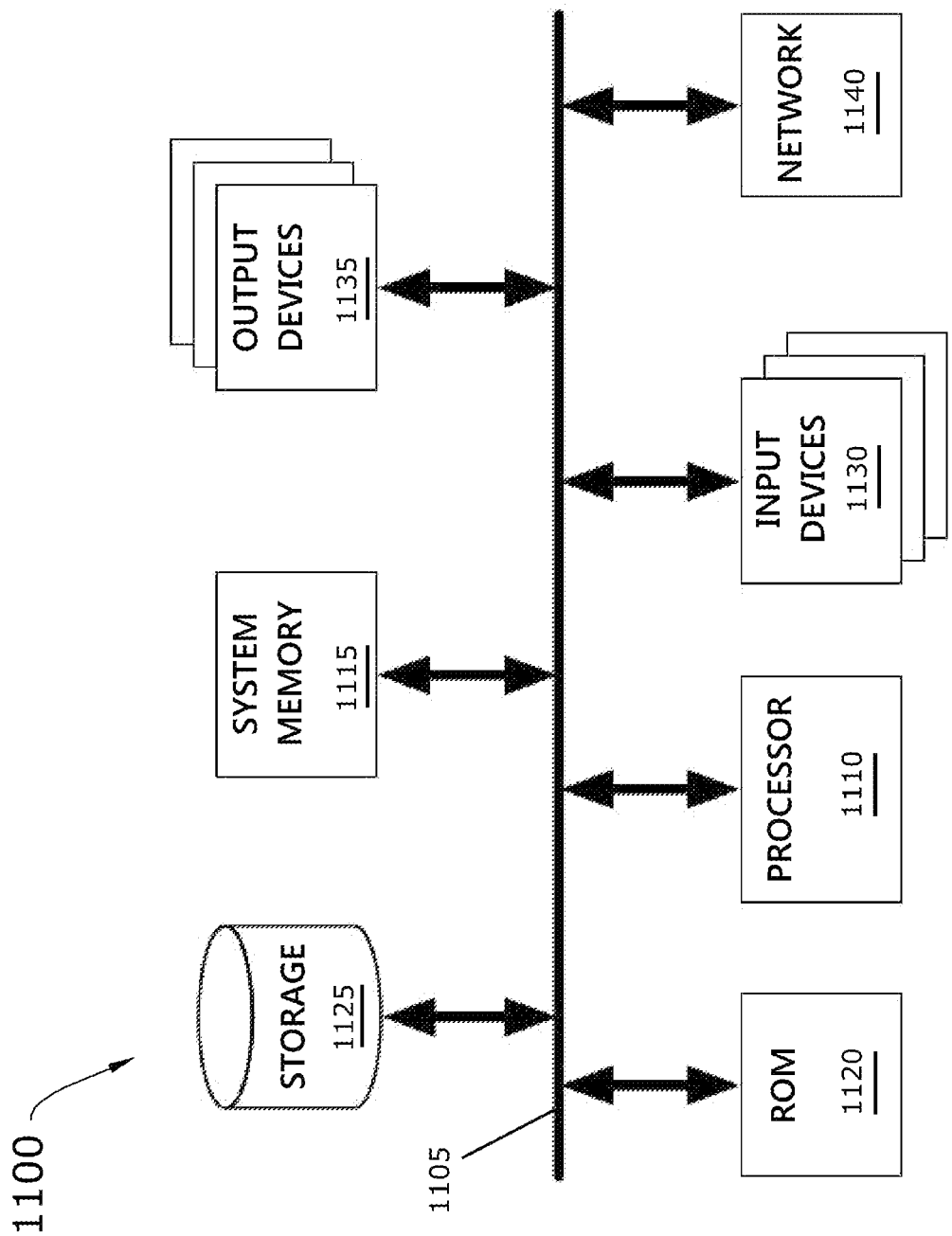
FIG. 11 conceptually illustrates an electronic system with which some aspects of the self-charging modular portable survival drone, such as the flight control and SOS signaling programs, are implemented.

By way of example, FIG. 11 conceptually illustrates an electronic system 1100. The electronic system controller 1010 (or "flight controller 1010"), described above by reference to FIG. 10, demonstrates an electronic system 1100 component of the self-charging modular portable survival drone of some embodiments. The electronic system 1100 may be a printed circuit board (PCB), a single board computer (SBC), or another control unit or circuit board assembly. Such an electronic system includes various types of computer readable media and interfaces for various other types of computer readable media. Electronic system 1100 includes a bus 1105, processing unit(s) 1110, a system memory 1115, a read-only memory 1120, a permanent storage device 1125, input devices 1130, output devices 1135, and a network 1140.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1120, the system memory 1115, and the permanent storage device 1125. From these various memory units, the processing unit(s) 1110 retrieves instructions to execute and data to process in order to execute the processes of the invention. The processing unit(s) may be a single processor or a multi-core processor in different embodiments.

The read-only-memory (ROM) 1120 stores static data and instructions that are needed by the processing unit(s) 1110 and other modules of the electronic system. The permanent storage device 1125, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1125.

Other embodiments use a removable storage device (such as a memory card) as the permanent storage device 1125. Like the permanent storage device 1125, the system memory 1115 is a read-and-write memory device. However, unlike storage device 1125, the system memory 1115 is a volatile read-and-write memory, such as a random-access memory. The system memory 1115 stores some of the instructions and data that the processor needs at runtime. In some embodiments, the invention's processes are stored in the system memory 1115, the permanent storage device 1125, and/or the read-only memory 1120. For example, the various memory units include instructions for flight operation in drone mode, shining high-intensity lights of the LED array, and/or sending out distress signals—that is, SOS signaling-over local search and rescue bands, etc. From these various memory units, the processing unit(s) 1110 retrieves instructions to execute and data to process in order to execute the processes of some embodiments.

The bus 1105 also connects to the input and output devices 1130 and 1135. The input devices enable the user to select commands and communication the command information to the electronic system. The input devices 1130 include at least the autonomous flight control interface 250, described above by reference to FIGS. 2-3 and 5-6. The input devices 1130 may optionally include conventional devices that connect to the self-charging modular portable survival drone by USB connection (such as wired connection to the USB port 330 described above, by reference to FIG. 3). Examples of conventional devices that may be connected to the self-charging modular portable survival drone include, without limitation, alphanumeric keyboards, touch-sensitive screens (where a "touchscreen" itself would operate as both an input device and an output display device), and mobile devices (which may connect in a charge-only mode or in a data interactive mode). The output devices 1135 include LEDs, such as the high output LED array 610, described above by reference to FIG. 6, and LEDs of the autonomous flight control interface 250 buttons, which are lit up depending on the user's selections in the autonomous flight control interface 250. Additionally, external output devices may be connected to the USB port 330 of the self-charging modular portable survival drone. The external output devices may include display devices, such as liquid crystal displays (LCD) and organic light emitting diode (OLED) displays, whether touch-sensitive or conventional.

Finally, as shown in FIG. 11, bus 1105 also couples electronic system 1100 to a network 1140 through a network adapter (not shown). In this manner, the electronic system 1100 can communicate across a network, such as a cellular or mobile data communications network, or radio networks including, without limitation, local search and rescue bands.

These functions described above can be implemented in digital electronic circuitry, in computer software, firmware, or hardware. The techniques can be implemented using one or more computer program products. Programmable processors and computers can be packaged or included in storage (such as solid-state devices), removable storage (SD memory cards, etc.), or in memory of a processing unit of a printed circuit board (PCB), a single board computer (SBC), or other electronic control unit or assembly. The processes may be performed by one or more programmable processors and by one or more set of programmable logic circuitry. General and special purpose computing and storage devices can be interconnected through communication networks.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A self-charging modular portable survival drone that recharges by natural elements comprising:
    a vehicle management control unit comprising a communications antenna and a plurality of male power and system interfaces disposed along an outer surface of the vehicle management control unit;
    a plurality of ducted fans and charging units arranged in a formation for a particular configuration, wherein each ducted fan and charging unit comprises a flight motor, a plurality of power generation alternators and stators, male blade-to-blade couplings, female blade-to-blade couplings that lock with the male blade-to-blade couplings, and rotating fans which are configured to rotate the alternators about the stators to generate current;
    a plurality of batteries encapsulated within the plurality of ducted fans and charging units, wherein each battery is encapsulated within a corresponding ducted fan and charging unit; and
    a plurality of universal serial bus (USB) ports that are integrated into and externally exposed on the plurality of ducted fans and charging units, wherein each USB port is configured to draw battery power from the battery encapsulated within the corresponding ducted fan and charging unit to charge an external device when the external device is connected to the USB port by via USB power cable.

2. The self-charging modular portable survival drone of claim 1, wherein the formation in which the plurality of ducted fans and charging units are arranged is a vertical stack formation and the particular configuration is one of a charging configuration and a carry configuration.

3. The self-charging modular portable survival drone of claim 2 further comprising a planetary gear assembly, a passive concentricity mechanism, and a plurality of expandable wind blades that connect at one end to the planetary gear assembly and at the other end to the passive concentricity mechanism, wherein the passive concentricity mechanism attaches to a bottom of the vertical stack arrangement of ducted fans and charging units and the planetary gear assembly attaches to a top of the vertical stack arrangement of ducted fans and charging units, wherein the vehicle management control unit attaches to a top side of the planetary gear assembly from a bottom side surface of the vehicle management control unit.

4. The self-charging modular portable survival drone of claim 3, wherein the plurality of expandable wind blades are closed in the carry configuration.

5. The self-charging modular portable survival drone of claim 3, wherein the charging configuration is a wind charging configuration, wherein the plurality of expandable wind blades are opened in the wind charging configuration.

6. The self-charging modular portable survival drone of claim 2, wherein the charging configuration comprises a water charging configuration when the vertical stack arrangement of ducted fans and charging units is isolated from the vehicle management control unit.

7. The self-charging modular portable survival drone of claim 1, wherein the formation in which the plurality of ducted fans and charging units are arranged is a horizontal planar formation and the particular configuration is a rescue drone configuration.

8. The self-charging modular portable survival drone of claim 7, wherein the vehicle management control unit further comprises an autonomous flight control interface disposed along the outer surface, wherein each ducted fan and charging unit comprises a female power and system interface, wherein each ducted fan and charging unit attaches to the vehicle management control unit by coupling the female power and system interface of the ducted fan and charging unit to a corresponding male power and system interface among the plurality of male power and system interfaces along the outer surface of the vehicle management control unit.

9. The self-charging modular portable survival drone of claim 8 further comprising a high output LED array along a bottom side surface of the vehicle management control unit, a flight controller embedded within the vehicle management control unit, a communications module that is communicably connected to the flight controller and to the antenna, and global positioning system (GPS) module that is configured to receive location data from satellites to determine GPS coordinates, wherein the autonomous flight control interface comprises a plurality of buttons associated with a plurality of different flight programs, wherein the autonomous flight control interface is communicably connected to the flight controller.

10. The self-charging modular portable survival drone of claim 9, wherein the flight controller comprises a program that is configured to (i) direct a flight operation at a particular elevation specified by a selection of a particular button among the plurality of buttons of the autonomous flight control interface, (ii) add the received GPS coordinates to a distress signal, and (iii) direct the communications module to wirelessly transmit the distress signal and GPS coordinates when the flight operation is at the particular elevation.

* * * * *